United States Patent [19]
Camden

[11] 3,862,877
[45] Jan. 28, 1975

[54] CLOTHLIKE TISSUE LAMINATES

[75] Inventor: James Berger Camden, Memphis, Tenn.

[73] Assignee: The Buckeye Cellulose Corporation, Cincinnati, Ohio

[22] Filed: May 22, 1972

[21] Appl. No.: 255,626

[52] U.S. Cl. .................. 161/57, 161/79, 161/85, 161/403, 161/89, 161/270, 161/251, 162/113, 128/290 W, 128/296, 156/179, 117/140 R, 117/155
[51] Int. Cl. ............................................. B32b 5/12
[58] Field of Search ............ 161/70, 54, 79, 85, 87, 161/141, 89, 244, 267, 403, 57, 58, 156; 156/179; 117/155, 76 D, 163, 140 R; 128/290 W, 296; 162/113, 124

[56] References Cited
UNITED STATES PATENTS

| | | | |
|---|---|---|---|
| 2,774,127 | 12/1956 | Secrist | 161/79 |
| 2,923,653 | 2/1960 | Matlin et al. | 117/140 R |
| 3,301,746 | 1/1967 | Sanford et al. | 162/113 |
| 3,502,537 | 3/1970 | Pearson et al. | 161/87 |
| 3,629,047 | 12/1971 | Davison | 161/141 |
| 3,655,422 | 4/1972 | Goldbeck et al. | 161/403 |

*Primary Examiner*—George F. Lesmes
*Assistant Examiner*—Paul J. Thibodeau
*Attorney, Agent, or Firm*—Richard C. Witte; William S. Shelow, III; Thomas H. O'Flaherty

[57] ABSTRACT

A clothlike tissue laminate suitable for use as surgical draping, clothing, towelling, tenting and other uses conventionally reserved to woven materials is prepared by impregnating a central layer of tissue with about 250% to about 800%, preferably about 300%, based on the fibrous weight of said center layer of soft, pliable and substantially plasticizer free, tacky, substantially nonmigratory latex binder solids having glass transition temperatures of about 10°C. to about −80°C., preferably about −30°C. and tack tests of about 2 pounds to about 40 pounds, preferably about 7 pounds to about 20 pounds. The latex binder solids are applied to the central tissue layer from high viscosity emulsions having a latex binder solids content, by weight, of about 40% to about 80%. The central impregnated tissue layer is then provided with soft tissue facings and, in one preferred embodiment, is reinforced with essentially unbonded scrim by pocket bonding on the scrim reinforced side prior to mechanical post treatment to result in a laminate with improved clothlike drape and handle. Reinforcement can also be provided by parallel sets of reinforcing strands placed in opposing directions on the opposite sides of the central tissue layer and by bonded scrims whose bonds are ruptured in processing. In other preferred embodiments the tissue layers of the laminate are prepared according to the disclosure of U.S. Pat. No. 3,301,746, issued to Lawrence H. Sanford and James B. Sisson on Jan. 31, 1967, and can be treated for moisture barrier, differential tissue layer dyeing and flame retarding functions.

22 Claims, 7 Drawing Figures

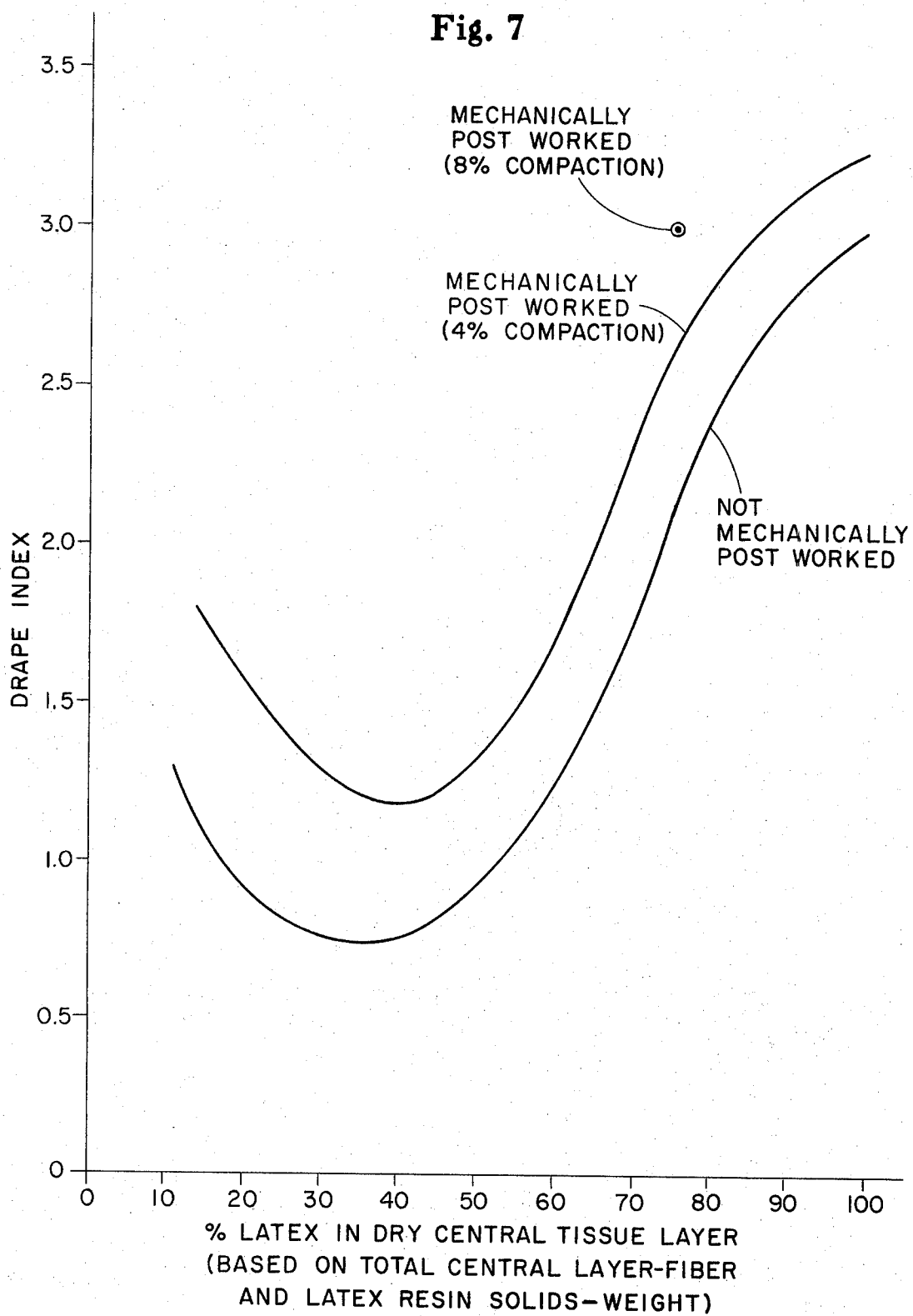

CLOTHLIKE TISSUE LAMINATES

BACKGROUND OF THE INVENTION

This invention relates to a method of combining tissue layers and, preferably, reinforcement strands to produce strong, pliable, absorbent and/or repellent clothlike tissue laminates or sheet materials suitable for use as surgical draping, clothing, towelling, tenting and other uses generally reserved to woven materials and the products produced thereby. Specifically, the invention consists of impregnating a central tissue layer with pliable nonmigratory latex binder solids applied from viscous emulsions in amounts exceeding conventional latex binder solids deposition in such impregnations. Thereafter, the highly impregnated central tissue layer is combined with a facing layer of tissue on the nether side and can be provided with a layer of either bonded, unbonded scrim or scrim with rupturable bonds as reinforcement prior to lamination with a tissue layer on the reinforcement side. While the invention is described primarily hereinafter in terms of tissue layers having a basis weight of about 1 to about 30 pounds per 3,000 square feet, there is also contemplated thereby the use of equivalent, soft, pliable fibrous sheeted structures generally described as nonwovens. When scrim reinforcement is provided, the tissue face layer on the reinforcement side of the laminate is combined with the central impregnated tissue layer in a pocket bonding fashion to surround, but not bond, the strands of the scrim reinforcement to the facing tissue layer. Alternatively, the reinforcement can take the form of either sinusoidal or substantially parallel sets of reinforcing strands placed in opposing directions on the opposite faces of the central tissue layer.

Heretofore, laminants have been prepared by impregnating a central tissue layer with latex binder solids of various physical properties and facing the impregnated layer with tissue. In certain instances, the resulting laminate has been provided with scrim reinforcement. In these applications of the laminating art, the objective has been to develop a laminate with clothlike attributes in strength, handle, pliability and absorbency. Practitioners of these arts have found it difficult or impossible to engender all of the functional attributes desired in a single sheet. This is to say that, if in the usual instance, the laminated sheets were combined and then impregnated by, for example, dipping with a migratory latex, the laminate suffered in absorbency and in surface feel. Further, if such a through bonded laminate was given a centrally disposed layer of the conventionally bonded scrim reinforcement, which scrim layer was sufficiently strong to develop clothlike strength, then the laminate tended to become stiff and unpliable. In brief, although those skilled in the art of laminate preparation have attempted for a lengthy period to produce satisfactory clothlike tissue laminates, their endeavors, whole producing laminates improved in many respects and used as a substitute for woven cloth, have not resulted in laminates having drape and strength qualities favorably comparable to those of woven cloth.

Notable examples of processes for the preparation of sheet and laminate materials are set forth in early patents, for example, U.S. Pat. No. 1,660,924, issued to Ernest Hopkinson on Feb. 28, 1928, while later patents such as U.S. Pat. No. 2,668,787, issued to August F. Schramm, Jr. on Feb. 9, 1954, illustrate methods of reinforcement. Additional patents, for example, U.S. Pat. No. 2,923,653, issued to Nathaniel A. Matlin and Benjamin B. Kine on Feb. 2, 1960; U.S. Pat. No. 2,931,749, issued to Benjamin B. Kine and Nathaniel A. Matlin on Apr. 5, 1960; U.S. Pat. No. 2,954,816 and U.S. Pat. No. 2,954,817, issued to Robert A. Havemann on Oct. 4, 1960; U.S. Pat. No. 3,063,454, issued to Herbert W. Coates and Roland A. Frate; U.S. Pat. No. 3,546,056, issued to Gordon D. Thomas on Apr. 29, 1968; U.S. Pat. No. 3,567,566, issued to Werner Bandel, Herbert Hilpert, Hans Treckmann and Ernst Pirot on Mar. 2, 1971 and U.S. Pat. No. 3,629,047, issued to Robert W. Davison on Dec. 21, 1971 have served to further the arts of sheet impregnation, lamination and reinforcement. Other patents, including Belgian Pat. No. 710,228, issued to Aktiebolaget Billingsfors-Langed on June 17, 1968; British Pat. No. 1,116,826, issued to Aktiebolaget Billingsfors-Langed on June 12, 1968; British Pat. No. 1,200,235, issued to Aktiebolaget Billingsfors-Langed on July 29, 1970 and British Pat. No. 1,185,227, issued to Consolidated Paper (Bahamas) Limited on Mar. 25, 1960 have similarly advanced the art of sheet lamination.

Applicant has discovered, however, that the clothlike attributes of laminate constructions, including those of tissue and tissue weight nonwovens, can be considerably enhanced and improved over the disclosures and suggestions available in the art. The nonwovens contemplated as equivalents of paper tissue as one or more of the layers making up the present clothlike laminates are, for example, of the spunbonded, carded web air-laid, and long fibered — wet laid types prepared from natural fibers as well as those prepared from synthetic fibers such as polyolefins, polyamides and rayons. In addition, sheet materials prepared from rayon fibers according to the disclosure and claims of U.S. Pat. No. 3,320,117, issued to Yoshikazu Aoki, Teruji Kamei and Akira Hayami on May 16, 1967 and U.S. Pat. No. 3,553,078, issued to Yoshikazu Aoki, Teruji Kamei, Akira Hayami and Masahiro Kitano on Jan. 5, 1971, can be used as layers in the present clothlike laminates.

As will be more fully set forth hereinbelow, the present improvement stems from application of greater than conventional quantities of particularly described soft, tacky, nonmigratory binder solids to a tissue layer centrally located and faced with additional tissue layers with or without scrim or strand reinforcement in the laminate produced. It is further considered necessary to the maximum achievement of the present clothlike laminate attributes that reinforcement scrim or strands present in the laminate be of a type whose adjacent or crossing strands are not bonded adhesively in the resulting clothlike laminate product; though such reinforcement can be initially combined in the laminate in bonded condition. Clothlike tissue laminates of enhanced drapability can be prepared according to the present invention with bonded scrim reinforcement. Such clothlike tissue laminates will exhibit improved drape as contrasted to comparable basis weight laminates of the art. An additional critical feature of the present clothlike laminate material is that scrim or strand reinforcement threads are not substantially adhesively bonded to the layers of facing tissue, and preferably any bonding present between adjacent reinforcement strands as placed in the laminate is substantially destroyed in processing. For certain uses where, for example, different colors or absorbency characteristics are desirable in two opposing clothlike laminate surfaces the present invention can engender these qualities in an advantageous fashion where they would be difficult or impossible to develop in woven materials.

SUMMARY OF THE INVENTION

In accordance with the present invention, it has been found that an improved sheet laminate material having clothlike qualities of strength, drape, low static electricity generation potential and absorbency, improved over previous laminates of comparable basis weight, can be prepared by first impregnating a central tissue layer, or equivalent nonwoven sheet, with greater than conventional quantities of a high solids content, substantially nonmigratory, aqueous emulsion of a pliable latex. The latex binder solids in such aqueous emulsions, suitable for use in practicing the present invention, have a glass transition temperature of about 10°C. to about −80°C., preferably −30°C., and a tack test, as defined hereinafter, of about 2 pounds to about 40 pounds, preferably about 7 pounds to about 20 pounds. Sufficient amounts of the aqueous emulsions are applied to insure deposition of about 250% to about 800%, preferably about 300%, of latex binder solids based upon the fibrous weight of said central tissue layer. As will be discussed hereinafter, both the unusually high latex binder solids content of the aqueous latex emulsion and the unusually high latex solids percentage, of a latex with specified properties applied to a central tissue layer are considered essential to attainment of the presently achieved clothlike laminate attributes. Subsequent to impregnation, the impregnated central tissue layer is combined with tissue facing layers and, in the reinforced embodiments, tissue facing layers together with interposed strand reinforcement situated on one or both sides of the latex impregnated central tissue layer. The nonmigratory nature of the latex impregnant employed insures that the solids content of the latex impregnation remains substantially in the central tissue layer, yielding only sufficient tackiness on the surfaces thereof to combine with the facing tissue layers in an overall fashion on laminate interface surfaces. Where strand reinforcement is present the facing tissue layer bridges single reinforcing strands or scrim reinforcing strands without adhesive attachment thereto. It is considered of importance that the aqueous latex binder solids emulsion used in the present invention be of a substantially nonmigratory type in order that the latex binder solids remain substantially where impregnated in the central tissue layer.

It is further considered important in achieving drape and handle in the present clothlike laminates that essentially no latex solids be present in the facing tissue layers. Such latex solids, if present, would form stiffening bonds between adjacent individual fibers within and on the outer surfaces of the facing tissue layers, thereby creating a less pliable and drapable clothlike laminate with a harsher hand. The desired placement of latex binder solids in the facing tissue layers is that where the latex solids form bonds only to those fibers in the facing tissue layers which are adjacent to the latex impregnated central tissue layer.

It is also considered preferable to maximum achievement of the improved clothlike laminate attributes in the present invention that woven scrim reinforcing layers be of an unbonded type. Unbonded in this context is used to describe that condition wherein the individual strands of the scrim or strand reinforcement material are not adhesively bonded together at their crossover points, if any; this being considered important to the development of the unusually high and improved drape in embodiments of the present clothlike laminate. The desired unbonded condition can be achieved either by a lack of bond at strand crossover points, by destruction of initial bonds in clothlike laminate processing or by placement of opposing direction reinforcing strands on opposite central tissue layer surfaces. Certain other advantages can be realized in flameproofing and in liquid barrier provision in the present laminate through utilization of preferred tissue layer placement of the materials used to engender such effects. For example, the clothlike tissue laminate product can be made absorbent on one side and be accorded either a moisture barrier or moisture repellent characteristic on the opposing side by treating the facing tissue layer, either separately or together with the central tissue layer, with a water repellent material prior to central tissue layer impregnation with latex binder solids and laminate combination. The entire clothlike tissue laminate can also be accorded water and alcohol repellency treatments subsequent to combining and drying. Solvent carried fluorocarbon-wax extended water and alcohol repellents are particularly applicable to overall treatment of preformed clothlike tissue laminates because solvents do not disturb the fiber-to-fiber bonds therein as would impregnation and rewetting with water carried materials. Similarly, dyeing of either or both, facing tissue layers prior to combination in a laminate product can be utilized to provide color differentiated surfaces in the resulting laminate product. The present invention contemplates the various combinations of dye, moisture repellency and moisture barrier effect that can be obtained by treatment of the central and facing tissue layers prior to laminate combination. Treatment with anti-static agents can also be applied to the present clothlike tissue laminates to further enhance their surprisingly low static potential as produced. The presently disclosed invention also contemplates the employment of scrim reinforcement on both sides of the central tissue layer where a clothlike laminate product of exceptionally high strength is desired. It is an additional characteristic of the present clothlike laminate products that they are extremely amenable, as contrasted with conventional sheet laminates, to the full development of their pliability and drape by the application of mechanical post working treatments such as creping, confinement beneath a rubber belt at varying tension (for example the well known treatment known by the tradename, "Clupaking" as further identified hereinafter), embossing treatments and "button breaking" as conventionally employed by those skilled in the art. It is further considered preferable, although not essential, in practicing the present invention that the tissue layers comprising the laminate be prepared according to the disclosure and claims of U.S. Pat. No. 3,301,746, issued to Lawrence H. Sanford and James B. Sisson on Jan. 31, 1967.

It is, accordingly, a principal object of this invention to provide a latex bonded clothlike tissue laminate with substantially all of its latex binder solids content residing in a central tissue layer, which tissue laminate exhibits enhanced drape, pliability and handle as compared to conventional tissue laminates.

It is a further object of this invention to provide latex bonded clothlike tissue laminates wherein pliable, tacky, nonmigratory latex binder solids are deposited in unconventionally increased amounts in a central tissue layer.

It is yet another object of this invention to provide latex bonded clothlike tissue laminates having reinforcing strands bonded to a central tissue layer, which reinforcing strands are, preferably, substantially devoid of bonding between either adjacent or crossing reinforcing strands and are also devoid of latex bonding between reinforcing strands and facing tissue layers.

Yet another specific object of this invention is to provide a latex bonded clothlike tissue laminate comprised of a central heavily latex impregnated tissue layer together with two facing tissue layers, one of which facing tissue layers has interposed between it and the central tissue layer a layer of woven strand reinforcement scrim.

BRIEF DESCRIPTION OF THE DRAWINGS

Other objects and advantages of this invention will become apparent as the description thereof proceeds in accordance with, and as illustrated by, the drawings wherein like numbers refer to like components in each figure and preferred embodiments of clothlike tissue laminates according to the present invention are illustrated. A graph illustrating the drape of clothlike tissue laminates according to various impregnation amounts of the present latex binder solids is also provided to further illustrate an important beneficial aspect of the invention.

FIG. 7 is a graph illustrating the importance of latex binder solids impregnation percentage in achieving the pliability, as evidenced by drape, in the clothlike tissue laminates of the present invention.

DESCRIPTION OF THE PREFERRED EMBODIMENTS

Figure 1:
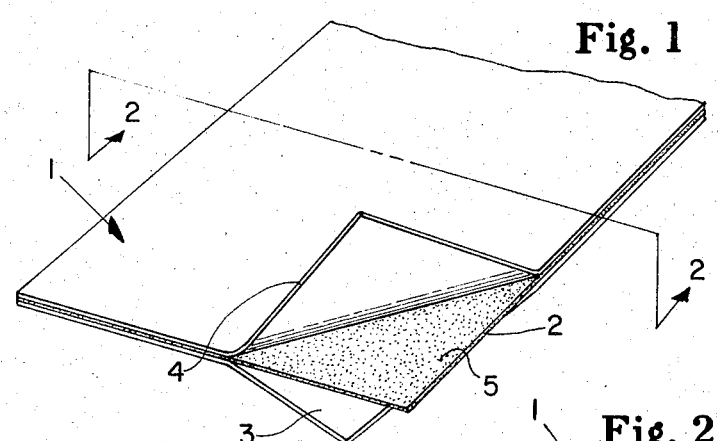
FIG. 1 is a plan view of one preferred embodiment of the clothlike tissue laminate of the present invention with tissue layer corners turned back to fully illustrate the central impregnated tissue layer and the facing tissue layers.

Referring now to FIG. 1 of the drawings, there is illustrated a clothlike tissue laminate 1 comprising central tissue layer 2, nether tissue layer 3 and upper tissue layer 4. The individual tissue layers, central tissue layer 2, nether tissue layer 3 and upper tissue layer 4, each have basis weights of 1 pound to about 30 pounds, preferably about 9 pounds, per 3,000 square feet.

Although individual tissue layers each having a basis weight of about 9 pounds per 3,000 square feet are preferred, clothlike tissue laminate 1 can be prepared from individual tissue layers having different basis weights within the above specified range. For example, central tissue layer 2, nether tissue layer 3 and upper tissue layer 4 can each have a basis weight of 6 pounds per 3,000 square feet. In other embodiments of clothlike tissue laminate 1, each of the individual tissue layers can either have a different basis weight or central tissue layer 2 can be faced with nether tissue layer 3 and upper tissue layer 4 having either a higher or lower basis weight than central tissue layer 2. In this manner, clothlike tissue laminate 1 can be adapted to have a single sidedness in basis weights and varying total basis weights can be achieved in clothlike tissue laminate 1 for specific uses.

As heretofore stated, the individual layers of clothlike tissue laminate 1 are comprised of pliable tissue. Any conventional tissue layer having a basis weight within the specified range is suitable for use in embodiments of the invention and can be selected to enhance desired attributes. The individual tissue layers are preferably creped, or otherwise post worked in an equivalent manner, prior to combination in clothlike tissue laminate 1. Due to the exemplary soft, bulky and absorbent features engendered therein, a particularly preferable tissue for use in the preparation of clothlike laminate 1 is the paper product disclosed and claimed in U.S. Pat. No. 3,301,746, issued to Lawrence H. Sanford and James B. Sisson on Jan. 31, 1967.

As previously stated, the unique clothlike properties of the present clothlike tissue laminate 1 are due in large measure to concentration of the soft, pliable, essentially plasticizer free, latex binder solids in central tissue layer 2. The use of uniquely high impregnations of latex binders solids 5 of specific properties, within the stated ranges, located in central tissue layer 2 is also necessary to achievement of the enhanced draping qualities of clothlike tissue laminate 1. It is important in appreciating the real contribution to the art of the present invention that it be realized that clothlike drape is dependent on latex binder solids 5 addition, as described, to the central tissue layer 2 in the percentage range specified and relatively independent of the basis weight of central tissue layer 2.

For use in the impregnation of central tissue layer 2 in clothlike tissue laminate 1, a water emulsion of soft, pliable and substantially plasticizer free latex binder solids 5 having glass transition temperatures of about 10°C. to about −80°C., preferably about −30°C. together with a tack test of about 2 pounds to about 40 pounds, preferably about 7 pounds to about 20 pounds, is employed. The water emulsions are of the nonmigrating type and have a latex binder solids 5 content of about 40% to about 80%, preferably 65%, by weight. The preferable water emulsions of latex binder solids 5 have a maximum mean particle size of about 5 microns. Latex binder solids 5 suitable for use in the invention are polymers and copolymers of acrylate esters, referred to generally herein as acrylics, vinyl acetate-ethylene copolymers, styrene-butadiene copolymers, vinyl chloride polymers, vinylidene chloride polymers, vinyl chloride-vinylidene chloride copolymers, acrylonitrile copolymers and acrylic-ethylene copolymers. The water emulsions of these latex binder solids 5 usually contain surfactants; preferably, the surfactants are modified during thermal drying so that they become incapable of rewetting. Of the latex binder solids enumerated, the acrylic polymer and vinyl acetate-ethylene copolymer types are preferred. For example, an acrylic polymer water emulsion suitable for use in the invention is available from the Rohm & Haas Company under the designation E–920. A specific water emulsion of latex binder solids 5 of the vinyl acetate-ethylene copolymer type is available from E. I. duPont de Nemours & Company, Inc. under the designation SW-5-2685-2.

Referring again to FIG. 1, clothlike tissue laminate 1 is produced by impregnating central tissue layer 2 with about 250% to about 800%, preferably about 300%, based on the fibrous weight of central tissue layer 2, of soft, pliable latex binder solids 5 having the above stated physical properties. The stated range of impregnation results in a central tissue layer 2, containing about 71% to about 89%, preferably 75%, of latex binder solids 5, based on the total weight of fiber and latex binder solids 5 contained therein. The latex binder solids 5 are applied from the above stated water emulsions containing about 40% to about 80%, preferably about 65%, by weight of latex binder solids 5. Such water emulsions of latex binder solids 5 can be applied by padding from rollers, spraying or other conventional systems for applying impregnation materials to paper, including gravure and intaglio coating processes.

Impregnated central tissue layer 2 is immediately combined, or laminated, after impregnation with nether tissue layer 3 and upper tissue layer 4 to form clothlike tissue laminate 1. The combining preferably takes place in at least one low pressure nip between rolls, for example between rubber covered rolls, to enhance and preserve bulk, hand and softness in clothlike tissue laminate 1. Metal rolls can also be used for combining due to the inherent bulk and resiliency of the laminate products. Other means of low pressure combining, for example, combining over a vacuum box or breaking over a bar can also be employed alone or in combination with roll nips.

Subsequent to combination of impregnated central tissue layer 2, nether tissue layer 3 and upper tissue layer 4, clothlike tissue laminate 1 is thermally dried to drive off water and, if appropriate, cure the latex impregnants. Such thermal drying can be accomplished by conventional steam drum drying systems. Other conventional thermal drying systems employing either heated air circulating about conveyor belts in enclosed tunnels or infrared sources can also be used in accomplishing the thermal drying. Micro-wave drying can also be employed.

After drying, clothlike tissue laminate 1 is preferably accorded a mechanical post working treatment to fully develop its unique draping characteristics. This post working treatment can be applied by differential working against a tensioned rubber belt in a system like that disclosed in U.S. Pat. No. 2,624,245, issued to Sanford L. Cluett on Jan. 6, 1953 and known as "Clupaking." Mechanical compaction treatments resulting in about 1% to about 30%, preferably about 4% to about 20%, compaction have been found desirable and such treatments can be applied repetitively with intermittent or subsequent pullout of substantial amounts of the compaction. The mechanical working can also be accomplished by other mechanical treatments akin to creping or passage through button breaking rolls. In the instance that the latex binder solids 5 are thermoplastic in nature, bonding and therefore resistance to delamination, can be enhanced by post treatment of the clothlike laminates by the use of pressure in the nips of heated rolls in an overall or selected pattern.

Figure 2:
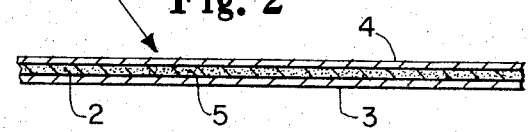
FIG. 2 is an enlarged cross sectional view of the clothlike tissue laminate illustrated in FIG. 1, which cross sectional view illustrates placement of latex binder solids in the central tissue layer and the substantial absence of latex binder solids in the facing tissue layers of the clothlike tissue laminate. The cross section of FIG. 2 is taken along the line 2—2 in FIG. 1.

Referring now to the enlarged cross sectional view of clothlike tissue laminate 1 shown in FIG. 2, there is illustrated central tissue layer 2 with latex binder solids 5 therein as is also illustrated in FIG. 1. As stated heretofore, the unique drape and pliability properties of clothlike tissue laminate 1 are believed due to the combination of soft, pliable tissue layers, central tissue layer 2, nether tissue layer 3 and upper tissue later 4, in clothlike tissue laminate 1 having therein central tissue layer 2 containing the stated uniquely increased quantity of specified latex binder solids 5. As illustrated in FIGS. 1 and 2, the latex binder solids 5 are nonmigratory and remain substantially in central tissue layer 2. Applicant has discovered that this placement of latex binder solids 5 achieves a uniquely enhanced draping characteristic in clothlike laminate while resulting in an overall economic usage of latex binder solids 5 in clothlike tissue laminate 1 despite their uniquely high concentration in central tissue layer 2.

One preferred embodiment of the invention employs a spunbonded web of polyolefin fibers in forming clothlike tissue laminate 1. This embodiment is comprised of central tissue layer 2, which is a spunbonded web of polyolefin fibers, nether tissue layer 3 and upper tissue layer 4, each of said tissue layers having a basis weight of about 9 pounds, precisely 8.75 pounds per 3,000 square feet.

This preferred embodiment of clothlike tissue laminate 1 is produced by first treating two of the layers, the polyolefin spunbonded tissue used in place of central tissue layer 2 and nether tissue layer 3 for water and alcohol repellency with about 5%, based on their fibrous weight, of fluorocarbon-wax extended water repellent solids. The polyolefin spunbonded tissue employed in this embodiment as central tissue layer 2 is then impregnated, by use of a padding roll, with 300% of its fibrous weight of vinyl acetate-ethylene copolymer latex binder solids 5. These binder solids have a glass transition temperature of −30°C. and a tack test of 10 pounds. This impregnation results in a central tissue layer 2, in this embodiment a polyolefin fiber spunbonded tissue, having a latex binder solids 5 content, as subsequently dried, of 75%, based on the total weight of fiber and latex binder solids 5 in central tissue layer 2. The latex binder solids 5 are applied from a water emulsion containing 64%, by weight, of latex binder solids.

Subsequent to impregnation, undried central tissue layer 2, in this embodiment a polyolefin spunbonded fiber tissue, is combined with the stated water and alcohol absorbent upper tissue layer 4 and with water and alcohol repellent nether tissue layer 3. The so combined clothlike tissue laminate 1 is thermally dried prior to being accorded a post working treatment between a heated drum and a tensioned rubber belt "Clupaking" equivalent to 8% compaction. This preferred embodiment of clothlike tissue laminate 1 exhibits a drape index, as hereinafter defined, of 3.0 which compares favorably with the drape index of laundered muslin at 3.0. In addition, desirable qualities of hand and lack of paperlike rustle, are enhanced therein. The heavily impregnated central spunbonded layer contributes to an impression of bulk and body as well as affording desired strength properties. it will be appreciated that this method of construction allows upper tissue layer 4 to remain absorbent while maintaining air porosity together with water and alcohol penetration resistance in clothlike laminate 1.

Another equally desirable clothlike tissue laminate can be prepared using an equivalent spunbonded tissue prepared from polyamide "nylon" fibers as central tissue layer 2. It is again to be understood that, whereas the foregoing specific embodiment contains a spunbonded tissue as central tissue layer 2, any of the structural embodiments of the clothlike laminates disclosed in this invention can contain, in any combination, nonwoven materials as tissues in any one or more of their tissue layers.

Figure 3:
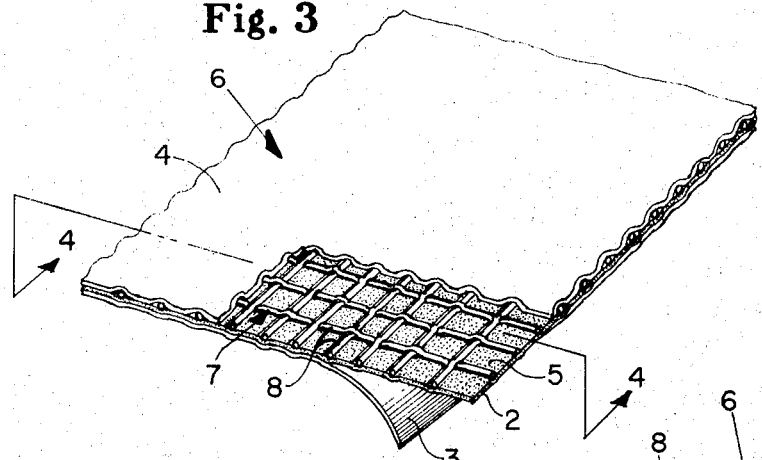
FIG. 3 is a plan view of a clothlike tissue laminate provided with scrim reinforcement on one face of the central impregnated tissue layer according to a preferred embodiment of the invention. Facing tissue layer corners are turned back to fully illustrate unbonded scrim placement.

Referring now to FIG. 3 of the drawings, there is illustrated a woven scrim reinforced clothlike tissue laminate 6. This embodiment of the invention is produced in a like manner to that of clothlike tissue laminate 1 with the exception that a woven scrim 7 is placed between central tissue layer 2 and one of the facing tissue layers applied thereto. In FIG. 3, woven scrim 7 is illustrated as placed between central tissue layer 2 and upper tissue layer 4. As will be discussed below, it is important to the achievement of maximum enhanced drape in woven scrim reinforced clothlike tissue laminate 6 that no permanent bonds exist between the strands 8 of woven scrim 7 such that strands 8 are free to move against one another at their crossover points.

In FIG. 3, there is again illustrated the concentration of latex binder solids 5 in central tissue layer 2, and it is specifically noted that, while the portion of strands 8 of woven scrim 7 lying adjacent to central tissue layer 2 are bonded thereto, there exists no bonding of strands 8 with upper tissue layer 4. It is also noted that the bonding of upper tissue layer 4 to central tissue layer 2 occurs through the mesh openings in woven scrim 7 in a manner to envelope, but not bond strands 8 at their crossover points. As in clothlike tissue laminate 1, the drape qualities of woven scrim reinforced clothlike tissue laminate 6 can be fully developed by mechanical post working treatment.

In producing the invention embodiment represented by woven scrim reinforced clothlike tissue laminate 6, the woven scrim 7 is used for reinforcement. Equivalent laid, knitted or open mesh spunbonded scrim reinforcing materials can also be used in preparing the clothlike tissue laminates.

Reference to absence of permanent bonds, in developing maximum drapability, is stated as meaning that woven scrim 7 shall either have no binder introduced during its manufacture to result in bonding at crossover points of strands 8 or that such bonding is accomplished with either a brittle or leachable material, for example, polyvinyl alcohol. Such bonds are either broken in mechanical post working treatments of woven scrim reinforced clothlike tissue laminate 6 or leached out to insure that substantially no permanent bonds are retained in the product laminate at the crossover points of strands 8. For example, polyvinyl alcohol as an initial scrim binder can be leached out with water.

Figure 4:
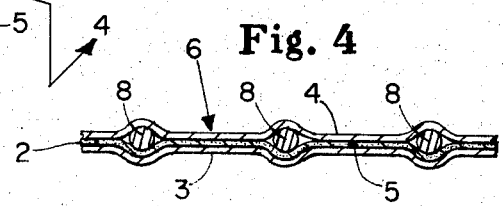
FIG. 4 is an enlarged cross sectional view of the reinforced clothlike tissue laminate embodiment illustrated in FIG. 3, which enlarged cross sectional view further illustrates the placement of the scrim reinforcement in the present clothlike tissue laminate and the pocket bonding of the facing tissue layer without adhesive bond thereof to the scrim strands. The cross section of FIG. 4 is taken along the line 4—4 in the FIG. 3.

Woven scrim 7 preferably consists of unbonded woven cotton scrim having multifilament strands 8. It is noted that multifilament strands 8 enhance drape in woven scrim reinforced clothlike laminate 6 in that only the fibers of such strands 8 adjacent central tissue paper layer 2 are bonded thereto in the structure illustrated by FIG. 4, and the fibers of such multifilament strands 8 are free to move relative to each other. Unbonded woven cotton scrims having multifilament strand counts per inch in the warp and weft directions of, for example, 14 by 10 and 12 by 12, and having a tensile strength of about 5 to about 8 pounds per inch, are preferred in woven scrim reinforced clothlike tissue laminate 6. Rayon and polyester fiber scrims having strand counts of 8 by 7 and 12 by 5 per inch are examples of other useful reinforcing scrims. Applicant has also found it useful to employ woven scrims having a higher strand count and thusly an increased tensile strength in the cross-machine direction. The increased cross-machine tensile strength can also be achieved by using lower strand counts of individually stronger strands 8. This method of employment of woven scrim 7 allows a woven scrim reinforced clothlike tissue laminate 6 having a substantially equal or other desired balance of tensile strengths in the machine and cross-machine directions.

One preferred embodiment of woven scrim reinforced clothlike tissue laminate 6, of particular usefulness as a surgical drape material, is comprised of central tissue layer 2, nether tissue layer 3, upper tissue layer 4 and woven scrim 7. Each of said tissue layers has a basis weight of about 9 pounds, more precisely 8.75 pounds, per 3,000 square feet. In this preferred embodiment of woven scrim reinforced clothlike tissue laminate 6, woven scrim 7 comprises an unbonded woven cotton scrim having a strand count of 14 by 10 multifilament strands per inch. The woven scrim 7 is fabricated so that there are 14 strands in the machine direction of woven scrim reinforced clothlike tissue laminate 6.

This preferred embodiment of woven scrim reinforced clothlike tissue laminate 6 is produced by first treating two of the tissue layers, central tissue layer 2 and nether tissue layer 3 for water and alcohol repellency with 5%, by fibrous weight, of a fluorocarbon water repellent in conjunction with wax type extenders. Central tissue layer 2 is then impregnated from a padding roll with 300% of its fibrous weight of acrylic latex binder solids 5 having a glass transition temperature of −30°C. and a tack test of 10 pounds. This impregnation results in a central tissue layer 2 having a latex binder solids 5 content, as subsequently dried, of 75%, based on the total weight of fiber and latex binder solids 5 in central tissue layer 2. The latex binder solids 5 are applied from a water emulsion containing 65%, by weight, of latex binder solids.

Subsequent to impregnation, undried central tissue layer 2 is combined with the specified woven scrim 7, adjacent water and alcohol absorbent upper tissue layer 4 and with water and alcohol repellent nether tissue layer 3. The so combined unbonded woven scrim reinforced clothlike tissue laminate 6 is thermally dried and its latex binder solids 5 content cured prior to being accorded a mechanical post working treatment by "Clupaking" amounting to an 8% compaction. This preferred embodiment of woven scrim reinforced clothlike tissue laminate 6 exhibits a drape index of 3.0 which compares favorably with a laundered muslin bedsheet with a drape index of 3.0 and a laundered percale bedsheet with a drape index of 3.5.

In addition, the desirable qualities of hand, lack of rustle and a feeling of bulk and body are enhanced therein, and this embodiment is absorbent on the upper tissue layer 4 side while maintaining air porosity together with water and alcohol through penetration resistance.

In further preferred embodiments of woven scrim reinforced clothlike tissue laminate 6, as well as in the other illustrated embodiments, dyes can be used to color one or more of the water latex emulsions, woven scrim 7, central tissue layer 2, nether tissue layer 3 and upper tissue layer 4 for the purposes of opacity enhancement, color identification, low light reflectance, aesthetic enhancement and easy differentiation between sides of clothlike tissue laminate embodiment 5 having an absorbent side and a fluid repellent side. Other embodiments of the invention include those wherein all possible tissue layer combinations of the illustrated clothlike laminate structures are made either water and alcohol repellent, or absorbent, and those wherein a flame retardant, for example ammonium chloride, ammonium sulfamate, diammonium phosphate, triammonium phosphate, or tris (2,3-dibromopropyl) phosphate, is included in central tissue layer 2 in 5% to 30% amounts, based on the total weight of the impregnated central tissue layer 2.

As stated herein, it is considered preferable that the scrim reinforcement employed be devoid of permanent bonding at strand crossover points. Still, clothlike tissue laminates of the present invention prepared with scrim reinforcement having bonded strand crossover points will also exhibit enhanced drape as compared with comparable basis weight laminates known in the art. Therefore, in clothlike tissue laminates requiring exceptional strength at the expense of achieving maximum drapability, bonded scrim reinforcing materials are preferred within the scope of this invention. Such clothlike tissue laminates when acccorded an 8% compaction by mechanical post working treatments can exhibit a drape index of 2.5.

Figure 5:
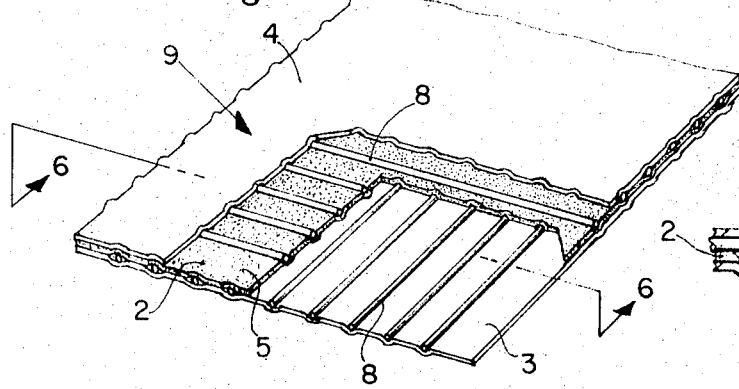
FIG. 5 is a plan view of a clothlike tissue laminate provided with parallel strands of reinforcement on opposite sides of a central latex impregnated tissue layer according to yet another preferred embodiment of the invention.
Figure 6:
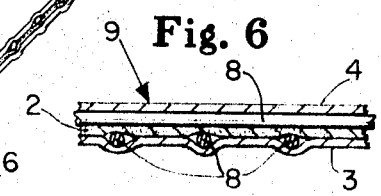
FIG. 6 is an enlarged cross sectional view of the reinforced clothlike tissue laminate illustrated in FIG. 5 wherein the cross section is taken along the line 6—6 of FIG. 5.

Referring now to FIG. 5, there is illustrated yet another preferred embodiment of the invention as strand reinforced clothlike tissue laminate 9. In this embodiment, strands 8 are placed in parallel sets, equivalent to the spacing in woven scrim 7, on both sides of impregnated central tissue layer 2. The parallel sets of reinforcing strands 8 are illustrated in FIG. 5 as placed in the machine and cross-machine directions as straight strands 8. In other embodiments of the strand reinforced clothlike tissue laminate 9, which results in a balanced laminate structure, the spaced sets of strands 8 can be sinusoidally placed and can be placed so that their axis is at a selected angle to the machine and cross-machine directions of strand reinforced clothlike tissue laminate 9. FIG. 6 illustrates the balanced laminate structure of strand reinforced clothlike tissue laminate 9 and further illustrates the nature of the present clothlike tissue laminate wherein reinforcing strands 8 are surface bonded to central tissue layer 2 and are enveloped by, but not bonded to, nether tissue layer 3 and upper tissue layer 4.

Referring now to FIG. 7, there is illustrated a graph wherein the drape indices, characterized below, of unbonded woven scrim reinforced clothlike tissue laminate 6 at varying percentages of final latex binder solids content, by weight, in central tissue layer 2 are plotted. The woven scrim reinforced clothlike tissue laminate 6 samples tested to develop the graph lines in FIG. 7 each had a central tissue layer 2, a nether tissue layer 3 and an upper tissue layer 4 having an 8.75 pound per 3,000 square foot basis weight. These tissue layers were made according to the process disclosed and claimed in U.S. Pat. No. 3,301,746, issued to Lawrence H. Sanford and James B. Sisson on Jan. 31, 1967. The acrylic latex binder solids used to prepare the test samples had a glass transition temperature of $-31°C$. and a tack test of 10 pounds. They were applied to central tissue layer 2 from a water emulsion containing 65% by weight of latex binder solids. The water emulsions of acrylic latex binder solids used were received from Celanese Corporation of America under the designation CPE-4672. The graph lines of FIG. 7 illustrate the decreasing drape index, i.e., poorer clothlike laminate flexibility and drape, achieved as the percent latex binder solids is increased from about 15% to 40% in the dry central tissue layer 2, based upon the total dry central tissue layer weight. Below about 15% latex binder solids no laminate exists due to lack of tissue layer bonding. The upper graph line represents the drape index of samples accorded a 4% compaction post drying mechanical treatment by the "Clupak" process while the lower graph line represents samples not accorded a post drying mechanical treatment. The portion of the graph lines wherein 40% to 100% of latex binder solids are present in central tissue layer 2, on the previously stated basis, illustrates the continuing increase in drape index and clothlike draping quality achieved with the specified latex impregnants. The single point, at drape index 3.0, shown at a latex impregnation of 75% on FIG. 7 represents the drape index attained by the samples of FIG. 7 at the preferred point of latex binder solids impregnation when accorded an 8% mechanical compaction treatment.

Applicant uses a latex binder solids content of 71% to 89%, on the basis of FIG. 7, because of latex binder solids contents of less than 71% clothlike laminates of the present invention remain in the poorer drape index ranges, or delaminate, while latex binder solids contents of above 89% result in a detrimental loss in air porosity. The latex binder solids content of 71% to 89% in the central layer, based on the total central layer — fiber and latex resin solids — weight, is equal to about 250% to about 800% based on only the fiber weight of the central tissue layer. While latex binder solid contents of greater than 89% result in increased drape indices as illustrated, the resulting clothlike tissue laminates, although suitable for many purposes other than surgical drapes and gown, lose air porosity. Although the graph lines illustrate the trend of drape indices in the 15% to 40% range, applicant notes that clothlike laminates so prepared have low tensile strength, delaminate or tend to delaminate in use and are other wise undesirable in cloth-like attributes.

Tack tests and drape index values have been set forth herein to specify the properties, respectively, of the present latex binders and clothlike tissue laminates. In describing the latex binder solids used to prepare clothlike laminates, the tack test set forth is obtained by a test procedure wherein a 10 by 10 inch piece of laundered and ironed fine combed 100% cotton percale bed sheeting, having a thread count of 100 threads by 80 threads per inch is first cut. The 10 by 10 inch piece of bed sheeting is then backed with a piece of polyurethane film having a thickness of 1 mil. The bed sheeting–polyurethane film composite is then placed, film side down and flat, on a flat glass plate and secured thereto by pressure sensitive tape.

The test latex binder solids are then cast as a film upon the secured bed sheeting–polyurethane composite using an 8 inch wide Gardner knife, as supplied by Gardner Laboratory, Inc., Bethesda, Md. In casting the test film the Gardner knife is set to a clearance of 30 mils, and the water emulsion of latex binder solids to be tested is cast and allowed to dry overnight at a temperature of 75°F. In casting, the film area is stopped so that a strip of uncoated cloth 1 inch wide remains at the cloth edge.

After drying overnight a 4 by 5 inch sample is cut from the coated cloth to contain a 4 by 4 inch latex film coated area and a 1 by 4 inch uncoated area. A second 4 by 5 inch piece of the same laundered and ironed fine combed 100% cotton percale bed sheeting is placed coextensively on the latex film coated side of the dried latex film coated, 4 by 5 inch sample. The so formed composite of two 4 by 5 inch pieces of bed sheeting with dry latex film between is placed between two 4 by 4 inch pieces of ⅛-inch thick "Plexiglas" (methyl methacrylate)-type polymer sheets. The 4 by 4 inch area between the "Plexiglas" sheets is then placed in a hydraulic press under a total force of 16,000 pounds for 10 seconds. The so bonded two pieces of bed sheeting are then conditioned for at least 24 hours at 75°F. and 55% relative humidity.

After conditioning, 1 inch wide test strips, having dimensions of 1 by 5 inches, are cut from the bonded pieces. These test strips have a 1 by 4 inch bonded portion and two 1 inch square unbonded cloth tabs. The 1 inch square unbonded cloth tabs are fastened in the clamps of an Instron Tester, Model No. TM, Serial No. 658 and pulled apart perpendicularly to the bonded portion of the sample at a speed of 1 inch per minute. The average force (in pounds) required to pull apart, or peel, the second inch of bonded strip is calculated from the Instron chart. The average force in pounds so determined, is recorded. The numerical average of three such determinations for a latex film is the tack test reported herein.

In describing the clothlike drape of the present clothlike laminates for comparative purposes, drape index tests are used. The drape index, the procedure for which is described below, becomes an increasingly large number as thinner materials of essentially perfect drape and tested. At the other extreme of the drape index scale, the drape index of a stiff sample, for example cardboard, having no draping qualities, is zero.

The procedure for determining drape index consists of first cutting a circular sample having a diameter of 12 inches from the sample to be tested. The center of the circular sample, conditioned at 75°F. and 55% relative humidity, is then secured to the center of a supporting horizontal plate pedestal having a plate diameter of 3 inches and rests thereon and on a supporting wire screen having a 4-inch diameter hole in its center to clear the supporting horizontal plate. Next, the supporting wire screen is lowered away and the circular sample drapes freely without constraint over the supporting horizontal plate and conforms thereto according to its pliability and draping quality. A plastic screen is placed around the draped sample to prevent motion caused by air movement.

In order to obtain numbers for the calculation of a numerical drape index, a Polaroid Land Camera—Model 95A, using 3¼ inch by 4¼ inch Polaroid camera film, is mounted above the supporting horizontal plate with its optical axis perpendicular thereto and in line with the center of the supporting horizontal plate. The camera lens, using a Polaroid No. 1 close-up lens, is mounted at a distance of 29.5 inches above the supporting horizontal plate, so that the undraped circular sample having a 12-inch diameter, centered thereon is in focus and fills the print area. Four individual photographs of each of the supporting horizontal plate with a diameter of 3 inches, the undraped sample with a diameter of 12 inches and the draped sample are taken and developed. In the case of the draped sample, two photographs are taken of each side of the draped sample. The camera position, focus and alignment remains the same for all photographs.

After development of the photographs, the image of each photographed area is carefully cut out with a small scissors, and the cut out images are weighed on an analytical balance to an accuracy of ± 1 milligram. The numerical average of the four image weights for the supporting pedestal, the undraped sample and the draped sample are then individually calculated. The drape index is then calculated by the following formula wherein:

$P$ = numerical average of supporting horizontal plate photographic image weights;

$S_u$ = numerical average of undraped circular sample (wire screen supported) photographic image weights;

$s_d$ = numerical average of draped circular sample photographic image weights; and Drape Index = $[(S_u - P) - (S_d - P)]/(S_d - P)$ Since the photographic image weight procedure constitutes a precise method of obtaining facsimile values for the areas involved, it is noted that the drape index is the quotient obtained by dividing the decrease in drapeable area that has occurred by the total decrease in area further possible with a sample having perfect drape and zero thickness.

Those skilled in the art of paper and tissue laminate manufacture will readily perceive that, although the clothlike laminates of the present invention have been described primarily in embodiments directed to disposable usages in surgical draping, suurgical gowning, clothing, towelling and tenting, the possible usages of such clothlike laminates are multitudinous. In fact, the principles, as heretofore disclosed herein, can be employed wherever it is desired to laminate suitable sheeted fibrous materials such as paper, nonwovens, woven cloth, carded webs and spunbonded webs, etc., and combinations thereof in drapable, pliable laminates.

Therefore, while specific embodiments of the present invention have been described above, it will be apparent that many changes and modifications may be made in the described clothlike laminate structures and components without departing from the spirit of the invention. It will be further understood that the embodiments shown and the procedures set forth for their accomplishment are intended to be illustrative only and are not intended as limiting the scope of this invention, it being intended that all equivalents thereof be included in the scope of the appended claims.

Having thus described the invention, what is claimed is:

1. The clothlike tissue laminate comprising a central tissue layer impregnated with about 250% to about 800%, based on the fibrous weight of the central tissue layer, of soft, pliable latex binder solids having a glass transition temperature of about 10°C. to about −80°C. and a tack test of about 2 pounds to about 40 pounds, which central tissue layer is provided with and bonded to an upper tissue layer and a nether tissue layer, as facing tissue layers on its respective surfaces, and wherein the central tissue layer, the upper tissue layer and the nether tissue layer each have a basis weight of 1 pound to about 30 pounds per 3,000 square feet.

2. The clothlike tissue laminate of claim 1 wherein the central tissue layer is impregnated with about 300% based on the fibrous weight of the central tissue layer of soft, pliable latex binder solids having a glass transition temperature of about −30°C. and a tack test of about 7 pounds to about 20 pounds.

3. The clothlike tissue laminate of claim 1 wherein at least one of the tissue layers is a tissue characterized by having impressed in its surface, to a depth of at least 30% of its machine glazed caliper the knuckle pattern of an imprinting fabric having about 20 to about 60 meshes per inch, by having about 1% to about 14% of its surface compressed in said knuckle pattern to a relative density of at least 0.7 and by having a bulk density at 100 grams per square inch loading of about 1.0 to about 3.6, proportional to its basis weight.

4. The clothlike tissue laminate of claim 1 wherein the clothlike tissue laminate exhibits about 1% to about 30% mechanical compaction.

5. The clothlike tissue laminate of claim 1 wherein at least one of the tissue layers is water and alcohol repellent.

6. The clothlike tissue laminate of claim 1 wherein the central tissue layer contains flame retardant material and the clothlike tissue laminate is flame retardant.

7. The clothlike tissue laminate comprising a central tissue layer impregnated with about 250% to about 800%, based on the fibrous weight of the central tissue layer, of soft, pliable latex binder solids having a glass transition temperature of about 10°C. to about −80°C. and a tack test of about 2 pounds to about 40 pounds, which central tissue layer is provided with and bonded to an upper tissue layer and a nether tissue layer, as facing tissue layers on its respective surfaces, wherein the central tissue layer, the upper tissue layer and the nether tissue layer each have a basis weight of about 1 pound to about 30 pounds per 3,000 square feet, wherein a scrim reinforcing material is interposed between the central tissue layer and at least one of the upper tissue layer and the nether tissue layer and is bonded to the central tissue layer and wherein the facing tissue layers are bonded to the central tissue layer and through the mesh openings of the scrim reinforcing material.

8. The clothlike tissue laminate of claim 7 wherein the central tissue layer is impregnated with about 300%, based on the fibrous weight of the central tissue layer, of soft, pliable latex binder solids having a glass transition temperature of about −30°C. and a tack test of about 7 pounds to about 20 pounds.

9. The clothlike tissue laminate of claim 7 wherein at least one of the tissue layers is a tissue characterized by having impressed in its surface, to a depth of at least 30% of its machine glazed caliper the knuckle pattern of an imprinting fabric having about 20 to about 60 meshes per inch, by having about 1% to about 14% of its surface compressed in said knuckle pattern to a relative density of at least 0.7 and by having a bulk density at 100 grams per square inch loading of about 1.0 to about 3.6, proportional to its basis weight.

10. The clothlike tissue laminate of claim 7 wherein the clothlike tissue laminate exhibits about 1% to about 30% mechanical compaction.

11. The clothlike tissue laminate of claim 7 wherein at least one of the tissue layers and scrim reinforcing material is water and alcohol repellent.

12. The clothlike tissue laminate of claim 7 wherein the central tissue layer contains flame retardant material and the clothlike tissue laminate is flame retardant.

13. The clothlike tissue laminate of claim 7 wherein the scrim reinforcing material is unbonded woven cotton scrim having multifilament strands.

14. The clothlike tissue laminate comprising a central tissue layer impregnated with about 250% to about 800%, based on the fibrous weight of the central tissue layer, of soft, pliable latex binder solids having a glass transition temperature of about 10°C. to about −80°C. and a tack test of about 2 pounds to about 40 pounds, which central tissue layer is provided with and bonded to an upper tissue layer and a nether tissue layer, as facing tissue layers on its respective surfaces, wherein the central tissue layer, the upper tissue layer and the nether tissue layer each have a basis weight of about 1 pound to about 30 pounds per 3,000 square feet, and wherein reinforcing strands are interposed, as parallel sets of reinforcing strands placed in opposing directions on the opposite sides of the central tissue layer and bonded thereto.

15. The clothlike tissue laminate of claim 14 wherein the central tissue layer is impregnated with about 300%, based on the fibrous weight of the central tissue layer, of soft, pliable latex binder solids having a glass transition temperature of about −30°C. and a tack test of about 7 pounds to about 20 pounds.

16. The clothlike tissue laminate of claim 14 wherein at least one of the tissue layers is a tissue characterized by having impressed in its surface, to a depth of at least 30% of its machine glazed caliper the knuckle pattern of an imprinting fabric having about 20 to about 60 meshes per inch, by having about 1% to about 14% of its surface compressed in said knuckle pattern to a relative density of at least 0.7 and by having a bulk density at 100 grams per square inch loading of about 1.0 to about 3.6, proportional to its basis weight.

17. The clothlike tissue laminate of claim 14 wherein the clothlike tissue laminate exhibits about 1% to about 30% mechanical compaction.

18. The clothlike tissue laminate of claim 14 and wherein at least one of the tissue layers and parallel sets of reinforcing strands is water and alcohol repellent.

19. The clothlike tissue laminate of claim 14 wherein the central tissue layer contains flame retardant material and the clothlike tissue laminate is flame retardant.

20. The clothlike tissue laminate of claim 14 wherein the reinforcing strands are multifilament cotton strands.

21. The clothlike tissue laminate comprising a central tissue layer impregnated with about 300%, based on the fibrous weight of the central tissue layer, of soft, pliable latex binder solids having a glass transition temperature of about −30°C. and a tack test of about 10 pounds which central tissue layer is dyed, water and alcohol repellent and is provided with and bonded to a dyed absorbent upper tissue layer and a dyed, water and alcohol repellent nether tissue layer, as facing tissue layers on its respective surfaces, wherein the central tissue layer, the upper tissue layer and the nether tissue layer each have a basis weight of about 9 pounds per 3,000 square feet, wherein an unbonded woven cotton scrim having multifilament strand counts per inch of 14 by 10 in the machine and cross-machine directions, respectively, is interposed between the central tissue layer and the upper tissue layer and bonded to the central tissue layer, wherein the upper tissue layer is bonded to the central tissue layer through the mesh openings of the woven scrim reinforcing material, wherein each of the tissue layers is a tissue characterized by having impressed in its surface, to a depth of at least 30% of its machine glazed caliper the knuckle pattern of an imprinting fabric having about 20 to about 60 meshes per inch, by having about 1% to about 14% of its surface compressed in said knuckle pattern to a relative density of at least 0.7 and by having a bulk density at 100 grams per square inch loading of about 1.0 to about 3.6, proportional to its basis weight, and wherein the clothlike tissue laminate exhibits a mechanical compaction of about 8% and a drape index of about 3.0.

22. The clothlike tissue laminate of claim 21 wherein the upper tissue layer and unbonded woven cotton scrim are water and alcohol repellent.

* * * * *